2,955,954
PROCESS FOR TREATING SHAPED ARTICLES PREPARED FROM SYNTHETIC LINEAR POLYESTERS

Robert J. Collins, Kinston, N.C., assignor to E. I. du Pont de Nemours and Company, Wilmington, Del., a corporation of Delaware No Drawing. Filed Feb. 9, 1959, Ser. No. 791,796

8 Claims. (Cl. 117—47)

This invention relates to a process for treating articles prepared from high molecular weight synthetic linear polyesters. More particularly, it relates to a process for improving the surface characteristics of articles prepared from synthetic linear polyesters.

Although numerous methods have been proposed for treating polyester articles such as filaments, films, and the like, to improve their dyeability and reduce their tendency to accumulate electric charges, they have generally met with limited success due to the extreme hydrophobicity and chemical inertness of such articles. Included among the various methods which have been proposed are those in which various compositions are applied to the surface of the polyester articles. In such cases considerable difficulty has been experienced in attaching sufficient quantities of the material to the surface of the article as well as in obtaining acceptable washfastness.

It is, therefore, an object of this invention to provide a process for treating synthetic linear polyester articles to improve their surface characteristics. Another object of this invention is to provide a process for improving the dyeability and resistance to accumulation of electric charges of synthetic linear polyester articles.

The objects of this invention are accomplished by a process which comprises first treating the polyester article with a caustic solution of sufficient strength to activate the surface of said article, immersing said article in a solution containing a reagent capable of reacting with the activated surface of said article, and thereafter drying the article.

In practicing this invention the polyester article is first immersed in a caustic solution, for a time sufficiently long to reduce the weight of the article by at least 0.5%, thereby activating the surface polymer chains and increasing the number of available active hydrogen groups thereon. The time required to accomplish this step will vary from a few seconds to a few hours, depending on the concentration and temperature of the treating solution.

The article is then treated with a reagent capable of reacting with the active hydrogen group by immersing it in a solution containing the reaction product of a polyethylene glycol and an organic polyisocyanate or an acid anhydride of a polybasic acid. After treating, the polyester article is dried, preferably at a temperature from about 100° C. to about 150° C. The washfastness of articles so treated is outstanding.

The term "active hydrogen groups" refers to hydrogen atoms which, because of their position in the molecule, display activity according to the Zerewitinoff test as described by Kohler in "J. Am. Chem. Soc." 49, 3181 (1927).

Materials which are especially effective as pre-treating reagents for activating the polymer surface are solutions of alkali metal hydroxides, alkali metal salts of a weak acid, and lithium aluminum hydride. For example, aqueous solutions of sodium or potassium hydroxide may be used. Alternatively, hydroxides of other alkali metals may be used but will be less readily available and consequently more expensive. In some instances, it will be desirable to use salts derived from a strong base, e.g., an alkali metal hydroxide, and a weak acid such as phosphates, silicates, sulfides, and sulfites. Such a salt is suitable if it produces a pH of about 8.3 at a concentration of about 0.1 N. Mixtures of hydroxides and the aforementioned salts may also be used. In other instances, it may be desirable to use instead of an alkaline aqueous reagent a solution of lithium aluminum hydride in an organic solvent such as ethyl ether, tetrahydrofuran, and dimethyl cellosolve, followed by an acidified aqueous rinse.

The treatment with the caustic or hydrolyzing solution need not be a severe one, it being only necessary to bring about a change in the surface of the article. For example, in the case of fibers, the weight loss should be at least about 0.5% of the total weight of the fiber for effective treatment. It is preferred that the fiber weight loss be less than about 2% since greater loss represents needless waste of material. In a preferred procedure for fibers, solutions of $NaHCO_3$ with a concentration of 0.7% to 1.3% are used at a temperature of 95° C. to 100° C. for a period of thirty to ninety minutes.

The solution applied following the caustic treatment is conveniently prepared in an inert anhydrous organic solvent such as benzene, toluene, ethyl acetate, methyl ethyl ketone, ethyl ether, and the like, as will be described in detail later herein. Relatively small amounts of the polyethylene glycol-isocyanate and acid anhydride are sufficient to produce marked improvements in antistatic properties and dyeability. The treating solution should contain from about 1% to about 2% by weight of the isocyanate adduct with about 3% to about 10% being preferred. Likewise, the quantity of acid anhydride may be varied from about 1% to about 20% with about 3% to about 10% being preferred. Small amounts of catalyst, e.g., from about 5 to 25 mol percent based on the active reagents in the solution, of pyridine, methyl morpholine, triethyl amine, diethyl ethanol amine, and the like, may be added to the solution.

The polyethylene glycol-isocyanate reaction product may be conveniently prepared in an inert organic solvent solution by reacting substantially molar equivalents of polyethylene glycol and a polyisocyanate in such a manner that a free isocyanate group is maintained in each molecule. When the polyester article is treated with this mono-isocyanate adduct, the isocyanate functional group reacts with an active hydrogen group on the surface of the polyester structure thereby forming a permanent and washfast bond. After application of the polyethylene glycolisocyanate material, the polyester articles may be heated to hasten the attachment reaction.

Any organic polyisocyanate can be utilized, e.g., ethylene diisocyanate, dicyclohexylmethane diisocyanate, m-phenylene diisocyanate, toluene-2,4-diisocyanate, toluene-2,4,6-triisocyanate, and triphenylmethane-4,4',4''-triisocyanate. Best results have been obtained using hexamethylene diisocyanate. Examples of some of the polyethylene glycols which may be used are methoxypolyethylene glycol, ethoxypolyethylene glycol, polyethylene glycol chloride, and meta-cresyloxypolyethylene glycol. Best results are obtained when the molecular weight of the glycol is in the range from about 400 to 1000, and preferably from about 600 to 800.

The preparation of the glycol-isocyanate compounds is preferably carried out in an inert anhydrous solvent, e.g., benzene, toluene, methyl ethyl ketone, ethyl acetate, and ethyl ether, with application to the polyester article being made from the same solvent.

In preparing the acid anhydride solution, the anhydride is conveniently dissolved in any of the aforementioned inert organic solvents. Any anhydride of a polybasic acid may be used, such as phthalic, succinic, glutaric, methoxy phthalic, hydroxy phthalic, and the like.

The following examples further illustrate but are not intended to limit this invention.

EXAMPLE I

Yarn of 70 denier, 34 filaments, melt spun from a polyethylene terephthalate polymer, is woven into a fabric constructed 45 ends by 39 picks in the loom. Swatches of this fabric are then given a surface-activating treatment consisting of immersion in a solution containing 2% sodium hydroxide for a period of three minutes at a temperature of 95° C. The pretreated samples are then rinsed with water, acidified in a 5% hydrochloric acid solution for five minutes at room temperature, and then further rinsed and dried. Testing reveals substantially no loss in over-all polymer viscosity and only about 1% loss in fiber weight.

The samples thus prepared are now treated with an antistatic agent prepared as follows: methoxypolyethylene glycol (molecular weight 750) is dried by dissolving in benzene and distilling away part of the benzene. A solution of 20.4 parts of this material in 300 parts of benzene containing 0.2 part of pyridine is added dropwise over a period of one hour to a stirred refluxing solution consisting of 5.0 parts hexamethylene diisocyanate in 200 parts benzene. The mixture is refluxed (protected from moisture) for an additional two hours after completing the addition. Fabric treatment consists of immersing the swatches in the benzene solution, squeezing out the excess, and then drying the samples in air at 135° C. for twenty minutes.

The samples thus prepared are then tested for antistatic properties. This test is carried out by measuring the direct current resistance of the fabric at 50% relative humidity. High values expressed as the logarithm (base 10) of the resistance in ohms (termed log R) indicate that the fabric will readily acquire and retain a static charge. When the treated samples are tested, they have an initial log R value of 11.7 which decreases to 9.7 after five standard washings. A "standard washing" consists of a thirty-minute immersion in 60° C. water containing 0.5% of a detergent, made and sold by Procter and Gamble Company, Cincinnati, Ohio, under the trademark "Tide," in an agitation washer.

Fabric samples prepared exactly as described above, except that no caustic pretreatment is given, have an initial log R value of 15.1 which is substantially unchanged after five standard washings. Samples given only the caustic pretreatment have log R values above 15.

The advantage of the caustic pretreatment is obvious from the log R values obtained if it is realized that a fabric with a log R of 15 easily develops and retains a high static charge, whereas, in contrast, a fabric with a log R of 12 or below performs much the same as cotton fabric which is recognized as being free from objectionable static.

EXAMPLE II

Example I is repeated except that the following polyethylene glycols are substituted for methoxypolyethylene glycol–750 in the preparation of the antistatic agent with the results shown in Table 1 which follows.

*Table 1*

| Antistatic Agent Glycol Component | Log R of Treated Fabric After Five Washings | |
|---|---|---|
| | With Caustic Pretreatment | Without Caustic Pretreatment |
| Ethoxypolyethylene glycol (120)[1] | 13.2 | 13.8 |
| Polyethylene glycol chloride (200–220)[1] | 13.0 | 13.7 |
| Polyethylene glycol chloride (390–430)[1] | 13.5 | 14.2 |
| Meta-cresyloxypolyethylene glycol (525–575)[1] | 11.7 | 13.2 |
| Polyethylene glycol chloride (580–640)[1] | 12.8 | 14.1 |
| Polyethylene glycol (3000–3700)[1] | 13.6 | 15.0 |

[1] Molecular weight of the glycol component.

EXAMPLE III

Swatches of the untreated fabric of Example I are pretreated by immersing in a saturated solution of lithium aluminum hydride in ether at 22° C. for three hours, then quenched in water and acidified to remove excess reagent. Testing indicates a loss of 0.9% in fiber weight but substantially no loss in over-all polymer viscosity.

The pretreated swatches are then immersed in a benzene solution containing 5% of the reaction product of equal mols of meta-cresyloxypolyethylene glycol (molecular weight of about 540) and hexamethylene diisocyanate. The treatment is carried out by padding for five minutes at room temperature followed by curing at 135° C. for twenty minutes, following which the swatches are rinsed and scoured, then rinsed again.

The treated swatches when tested for antistatic properties are found to have a log R of 13.1 which decreases to 12.7 after five standard washings, whereas untreated fabric gives log R values greater than 15. A control fabric carried through a similar process except for the lithium aluminum hydride pretreatment is found to have an initial log R of 13.7 which decreases to 13.2 after five standard washings.

The usefulness of the fabric treatment of this example is apparent when it is realized that articles of clothing made from fabric with a log R of 12.7 are markedly more free of static-caused disadvantages such as lint attraction and clinging of the garment to the wearer than clothing from fabric with a log R value of 15, and appreciably better than clothing from fabric with a log R of 13.5.

That the pretreatment with lithium aluminum hydride described above has no deleterious effect on fabric properties is shown by the limited loss of weight (approximately 1%) and by the absence of change in polymer viscosity and in fabric strength.

EXAMPLE IV

Swatches of fabric pretreated with lithium aluminum hydride as in Example III are immersed in a dry benzene solution of phthalic anhydride (4% by weight) containing a catalytic trace of pyridine, squeezed dry and then cured in an oven at 135° C. for fifteen minutes. The treated swatches are then dyed with a basic dye in the same dye bath with other samples which have been given the phthalic anhydride treatment but not the lithium aluminum hydride pretreatment.

The basic dyebath contains 1% Victoria Green (C.I. 42,000), based on fabric weight; the bath to fabric ratio is 40:1, and the samples are dyed ninety minutes at the boil.

The dyed swatches are then given a standard wash, rinsed and dried, and their colors compared. The swatches which have been given the lithium aluminum hydride pretreatment are found to be at least six shades darker in color than those swatches which did not get such a pretreatment. The term "shade" is defined as the least discernible color difference between two samples when said samples are rated by an experienced observer. The significance of this result becomes more apparent when it is realized that by the process of this example a polyester fabric sample which is normally only barely stained by a basic dye has been made usefully dyeable by a basic dye.

Substantially equivalent results are obtained when the phthalic anhydride used in this example is replaced by one of the following compounds:

Succinic anhydride
Glutaric anhydride
4-methylphthalic anhydride
3-methoxyphthalic anhydride
3-hydroxyphthalic anhydride Similar results are obtained when the aqueous alkaline pretreatment of Example I is used in place of the lithium aluminum hydride pretreatment.

Thus, by the process of this invention, the number of reactive sites on the surface of the polyester fiber has been greatly increased, thereby changing the character of the fiber surface from that of a chemically inert material to that of a material amenable to chemical reactions. This change allows the tailoring of surface properties at will by the attachment of suitable molecular types of the polymer surface.

EXAMPLE V

A sample of 1.0 mil thick polyethylene terephthalate film is immersed for six minutes in an aqueous solution containing 2% potassium hydroxide at a temperature of 100° C. The sample is then rinsed with water, acidified with a 5% hydrochloric acid solution for five minutes at room temperature and then further rinsed and dried. The sample is found to have a loss in weight of less than 1% and substantially no loss in over-all polymer viscosity. The sample is then immersed in a benzene solution of the adduct of methoxypolyethylene glycol and hexamethylene diisocyanate described in Example I, allowed to drip dry, and then cured by heating in air at 135° C. for twenty minutes. Tested for antistatic properties by the method described in Example I, the sample is found to have a log R of 12.1 which is substantially unchanged after washing five times with a solution of 0.5% detergent.

A sample of the same film which did not receive the potassium hydroxide pretreatment is treated in the same manner with the methoxypolyethylene glycol-hexamethylene diisocyanate adduct and found to have a log R higher than 15.

Likewise, a sample of the same film given the potassium hydroxide pretreatment without the subsequent treatment with methoxypolyethylene glycol-hexamethylene diisocyanate is found to have a log R value above 15.

Thus it is apparent that the process of this invention gives an unexpected increase in electrical conductivity of polyethylene terephthalate film, which in practical terms means freedom from accumulation of static charges on the film.

Substantially equivalent results are obtained when the potassium hydroxide pretreatment of this example is replaced by treatment with sodium hydroxide or sodium bicarbonate as shown previously or with a 2% solution of tetrasodium pyrophosphate at a temperature of 95° C. to 100° C. for thirty minutes.

Likewise, substantially equivalent results are obtained when the pretreatment consists of exposure to a 1% solution of sodium carbonate at a temperature of 95° C. to 100° C. for sixty minutes.

Although this invention has been described particularly with reference to polyethylene terephthalate, it is also applicable to any other polyester of terephthalic acid and the glycol of a saturated hydrocarbon having 2 to 10 carbon atoms. Examples of suitable glycols include butylene glycol, decamethylene glycol, and trans bis-1,4-(hydroxymethyl)cyclohexane. It is also applicable to modified polymeric terephthalates, i.e., copolymers in which up to 15 mol percent of the terephthalic acid has been replaced by another dicarboxylic acid such as isophthalic acid, bibenzoic acid, hexahydroterephthalic acid, adipic acid, or sebacic acid. In addition, the polymer may be based upon more than one glycol from the series HO—R—OH where R is a hydrocarbon having from 2 to 10 carbon atoms, e.g., trimethylene glycol, pentamethylene glycol, or trans bis-1,4-(hydroxymethyl)cyclohexane.

While the process is particularly adapted to textile materials, such as webs, woven or knitted fabrics, felted articles, staple or continuous filament yarns in any stage of their preparation, and the like, it may also be used in the treatment of other shaped articles, such as molded articles, rods, pellicles of all kinds and particularly films, whereby antistatic properties may be improved. Alternatively, improvement in dyeability and ease of printing may be effected by after-treatment with appropriate compounds, following the process of this invention.

It will be apparent that many widely different embodiments of this invention may be made without departing from the spirit and scope thereof, and therefore it is not intended to be limited except as indicated in the appended claims.

I claim:

1. A process for treating a synthetic linear polyester article comprising the steps of immersing said article in a hydrolyzing solution containing a compound selected from the group consisting of an alkali metal hydroxide, an alkali metal salt of a weak acid, and lithium aluminum hydride, for a time sufficiently long to reduce the weight of said article by at least about 0.5%, thereby increasing the number of active hydrogen groups on the surface of said article, immersing the treated article in a solution comprising an inert anhydrous organic solvent having dissolved therein from about 1% to about 20% by weight of a reagent capable of reacting with said active hydrogen selected from the group consisting of an acid anhydride of a dicarboxylic acid and an adduct of a polyethylene glycol having a molecular weight from about 400 to about 1000 and an organic polyisocyanate, and thereafter drying said article at a temperature from about 100° C. to about 150° C.

2. The process of claim 1 wherein the solution of said reagent contains from about 3% to about 10% of said anhydride.

3. The process of claim 1 wherein the solution of said reagent contains from about 3% to about 10% of said adduct.

4. The process of claim 1 wherein said polyethylene glycol has a molecular weight from about 600 to about 800.

5. The process of claim 1 wherein said polyethylene glycol is methoxypolyethylene glycol and said polyisocyanate is hexamethylene diisocyanate.

6. The process of claim 2 wherein said anhydride is phthalic anyhdride.

7. The process of claim 1 wherein said article is a filament.

8. The process of claim 1 wherein said glycol is methoxypolyethylene glycol, said polyisocyanate is hexamethylene diisocyanate, and said anhydride is phthalic anhydride.

No references cited.

UNITED STATES PATENT OFFICE
CERTIFICATE OF CORRECTION

Patent No. 2,955,954                                           October 11, 1960

Robert J. Collins

It is hereby certified that error appears in the printed specification of the above numbered patent requiring correction and that the said Letters Patent should read as corrected below.

Column 2, line 30, for "2%" read -- 20% --; line 49, for "articles" read -- article --; column 5, line 9, for "of", second occurrence, read -- to --.

Signed and sealed this 25th day of April 1961.

(SEAL)
Attest:

ERNEST W. SWIDER
Attesting Officer

DAVID L. LADD
Commissioner of Patents